United States Patent [19]

Suzuki et al.

[11] Patent Number: 4,500,427
[45] Date of Patent: Feb. 19, 1985

[54] ACTIVATED-SLUDGE PROCESS FOR WASTEWATER TREATMENT

[75] Inventors: Akira Suzuki, Kasukabe; Yasumi Shioya; Norio Watanabe, both of Tokyo, all of Japan; Keiichi Kimura, deceased, late of Tsuchiura, Japan, by Kazuyoshi Kimura, Toshi Kimura, heirs

[73] Assignee: Shinryo Air Conditioning Co., Ltd., Tokyo, Japan

[21] Appl. No.: 439,578

[22] Filed: Nov. 5, 1982

[30] Foreign Application Priority Data

Nov. 9, 1981 [JP] Japan .............................. 56-179332

[51] Int. Cl.³ .............................................. C02F 3/12
[52] U.S. Cl. .................................. 210/608; 210/622; 210/625; 210/631; 210/903
[58] Field of Search ............... 210/903, 625, 631, 626, 210/627, 608, 609, 627; 622, 624, 703–705, 220–221.2, 628

[56] References Cited

U.S. PATENT DOCUMENTS 3,401,113  9/1968  Pruessner et al. .................. 210/626
3,959,124  5/1976  Tchobanoglous .................. 210/625
3,980,556  9/1976  Besik .................................. 210/903
4,290,884  9/1981  Mandt ................................ 210/903
4,341,632  7/1982  Gregor et al. ..................... 210/625

FOREIGN PATENT DOCUMENTS 2,909,723   9/1980  Fed. Rep. of Germany ...... 210/903
53-92551    8/1978  Japan ................................. 210/903
54-135448  10/1979  Japan ................................. 210/903
54-131348  10/1979  Japan ................................. 210/903

Primary Examiner—Benoit Castel
Attorney, Agent, or Firm—Oblon, Fisher, Spivak, McClelland & Maier

[57] ABSTRACT

An activated-sludge process for wastewater treatment comprising the steps of:
(1) feeding raw wastewater to an aeration tank containing activated sludge;
(2) supplying air into the aeration tank to produce aerobic and anaerobic areas in said tank;
(3) separating sludge from the mixed liquor coming out of the aeration tank and concentrating at least part of the separated sludge or said mixed liquor in a concentrator to thereby produce concentrated sludge and separated water; and
(4) feeding the concentrated sludge into the aeration tank and maintaining the MLSS concentration in said tank at a value between 7,000 to 15,000 mg/liter, thereby removing the organic matter and nitrogen components from the wastewater within said aeration tank.

6 Claims, 4 Drawing Figures

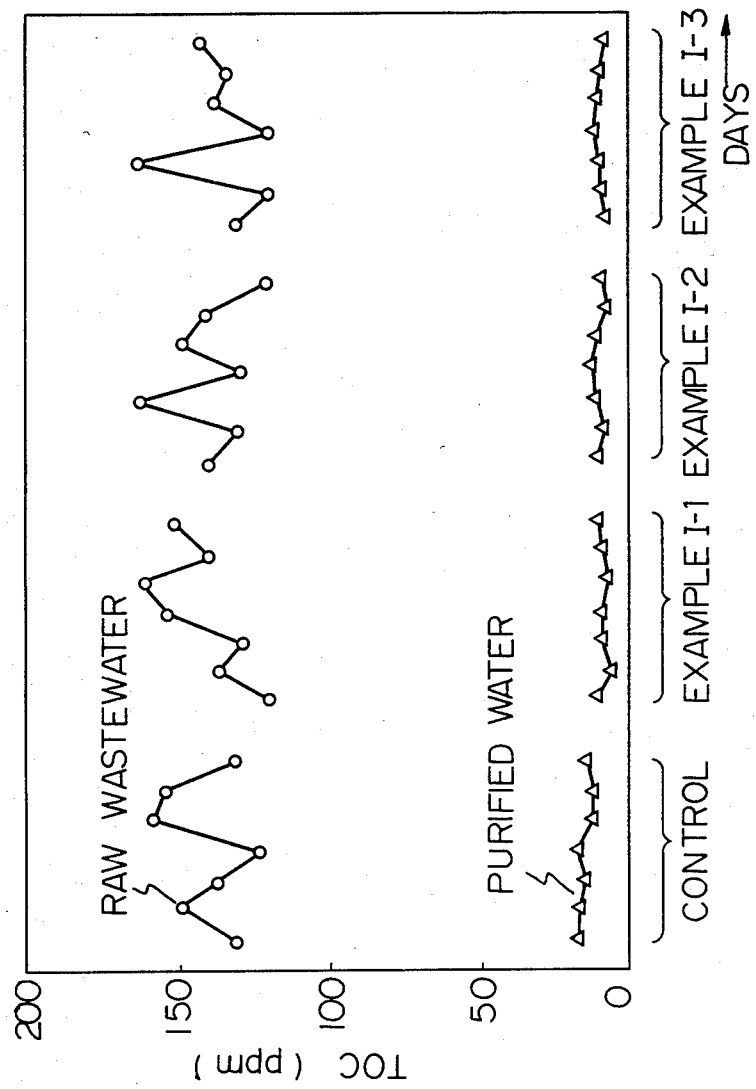

ACTIVATED-SLUDGE PROCESS FOR WASTEWATER TREATMENT

BACKGROUND OF THE INVENTION

The present invention relates to an activated-sludge process for wastewater treatment, and more particularly, to a method of decomposing organic matter, nitrifying and denitrifying nitrogen compounds by the activated-sludge process.

When sewage is simply treated by the activated-sludge process and its solids removed thereafter, the resulting clarified water contains an average of 10 to 20 ppm of nitrogen in the form of ammonia. If it is directly discharged into rivers and lakes, it upsets the environment by consuming the dissolved oxygen or promoting the growth of unwanted algae. As is well known, nitrosobacteria, nitrobacteria and denitrifying bacteria live in activated sludge; nitrogen in the form of ammonia is aerobically converted to nitrite nitrogen by nitrosobacteria or to nitrate nitrogen by nitrobacteria, and the nitrite or nitrate nitrogen is then reduced anaerobically to nitrogen gas by denitrifying bacteria and is discharged into the atmosphere.

Conventionally, organic matter is decomposed and nitrogen compounds are removed by a scheme consisting of three steps—removal of the BOD component by the activated-sludge process, nitrification and denitrification. More specifically, the BOD is removed from wastewater, an alkali is added to the supernatant overflowing a settling tank to adjust its pH to a value suitable for nitrification, and an organic carbon, generally methanol which is inexpensive, is added to the supernatant for effecting denitrification. This system uses a large amount of chemicals and requires high maintenance cost.

Nitrification and denitrification can be effected simultaneously with BOD removal in the same aeration tank, but to achieve the same BOD removal efficiency, activated sludge must be used in an amount about three times as much as is required in simply removing the BOD from wastewater. If the concentration of activated sludge in the aeration tank is increased, bulking occurs due to insufficient aeration, or the level of the activated sludge is increased and part of it overflows the settling tank. The sludge volume index (SVI) is used as an indication of the settleability of activated sludge, and its value is less than about 120 for ordinary sludge, but with poorly settleable sludge, the value is increased to between 200 and 400. Part of the poorly settleable sludge overflows the settling tank and it becomes difficult to maintain a high concentration of the sludge in the aeration tank, resulting in low efficiency of treatment. It has therefore been very difficult to achieve efficient and simultaneous performance of BOD removal, nitrification and denitrification in the same aeration tank.

Japanese patent application (OPI) No. 38190/81 (the symbol OPI means an unexamined published Japanese patent application) discloses a system for effecting BOD removal, nitrification and denitrification simultaneously. In this system, human waste is caused to flow successively through a mixing/decomposing tank, a nitrifying tank, a denitrifying tank, a re-aeration tank and a forced concentration tank. Part of the concentrated sludge is returned from the concentrator to the mixing/decomposing tank whereas part of the sludge is recycled from the nitrifying tank to the mixing/decomposing tank. This system is characterized by supplying a reduced quantity of water for diluting the human waste, and by simultaneous nitrification and denitrification in the mixing/decomposing tank. In the nitrifying tank, the remaining ammonia nitrogen is nitrified, nitrate or nitrite nitrogen is decomposed to nitrogen gas in the denitrifying tank, the remaining BOD is decomposed in the re-aeration tank, and a high concentration of activated sludge is separated from the liquor in the forced concentrator. The description of the overall system is rather vague and there is no knowing how much air is blown into which tank and in what manner, so the specific advantage of the system is not completely clear. In any event, nitrification and denitrification are effected in a tank separate from the tank for BOD removal, and the return sludge is sent not to the re-aeration tank for BOD removal, but to the mixing/decomposing tank where nitrification and denitrification are effected. What is more, all of the effluent from the re-aeration tank is thickened in the concentrator, which is not desired from an economical viewpoint.

SUMMARY OF THE INVENTION

An object of the present invention is to provide an activated-sludge process for wastewater treatment which uses only one aeration tank capable of removing efficiently the BOD, as well as nitrogen in the form of ammonia, nitrate and nitrite and which enables easy separation of solids from the liquor without decreasing the settleability of the sludge.

The present invention is an extension of the invention of copending U.S. Ser. No. 372,802, now U.S. Pat. No. 4,452,699 which discloses a method for secondary treatment of wastewater by the activated-sludge process wherein the sludge is concentrated in the system and returned to the aeration tank to thereby maintain the SVI of the sludge in that tank at the desired level.

The term "one aeration tank" as used herein means not only a physically single tank with or without baffle plates but also two or more tanks connected in series without having a solid/liquid separating mechanism between each tank.

The present invention provides an activated-sludge process for wastewater treatment comprising the steps of:

(1) feeding raw wastewater to an aeration tank containing activated sludge;
(2) supplying air into the aeration tank to produce aerobic and anaerobic areas in said tank;
(3) separating sludge from the mixed liquor coming out of the aeration tank and concentrating at least part of the separated sludge or said mixed liquor in a separate concentrator to thereby produce concentrated sludge and separated water; and
(4) feeding the concentrated sludge into the aeration tank and maintaining the concentration of mixed-liquor suspended solids (MLSS) in said tank at a value between 7,000 to 15,000 mg/liter, thereby removing the organic matter and nitrogen components from the wastewater within said aeration tank.

BRIEF DESCRIPTION OF THE DRAWINGS

FIG. 4 is a graph showing the change in the total organic carbon (TOC) content (in ppm) of raw wastewater (indicated by the solid circle) and purified water (indicated by the triangle).

DETAILED DESCRIPTION OF THE PREFERRED EMBODIMENTS

Figure 1:
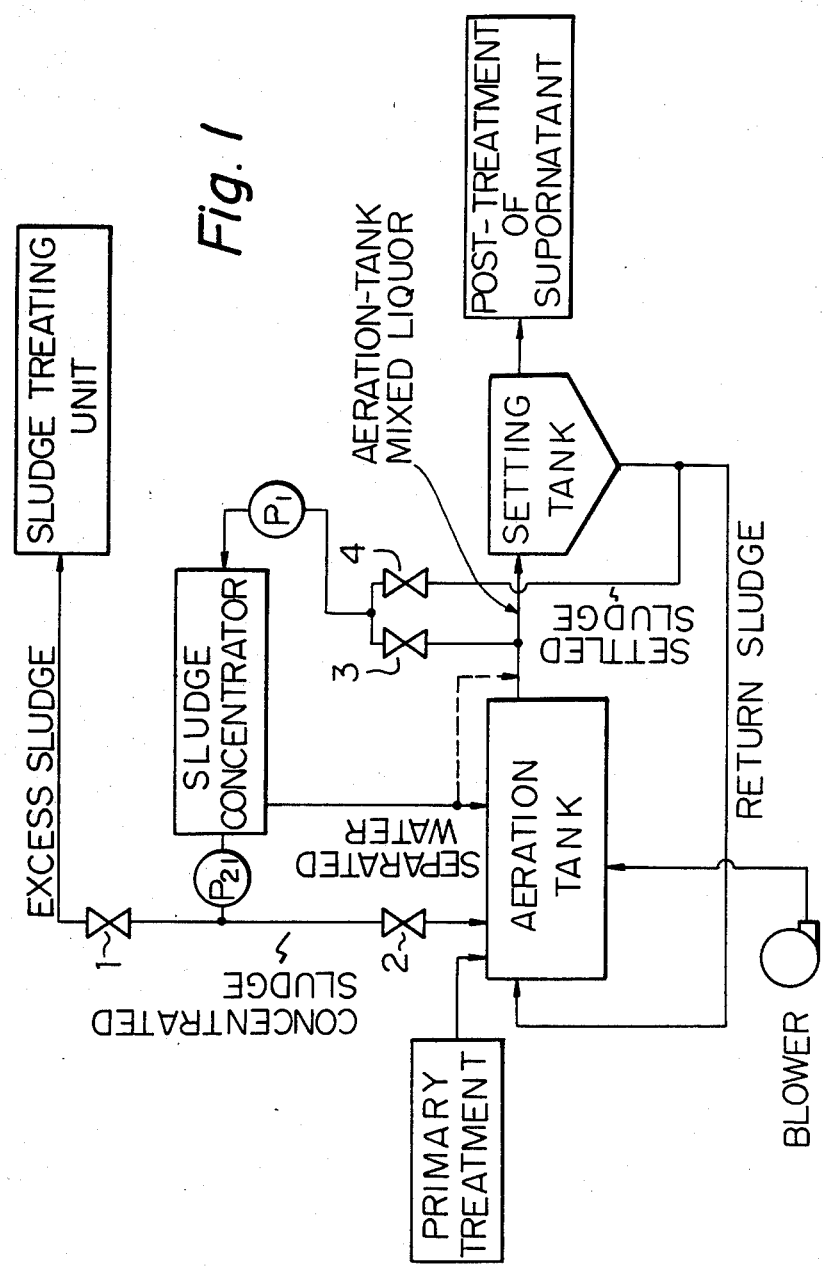
FIG. 1 is a flowsheet of one embodiment of the process of the present invention.

As mentioned above, the present invention provides a simple method for simultaneously removing organic matter and nitrogen components from wastewater in one aeration tank. In the method of the present inveniton, the MLSS concentration in the aeration tank must be held between 7,000 and 15,000 mg/liter, and a value between 10,000 and 15,000 mg/liter is particularly preferred. If the MLSS is less than 7,000 mg/liter when air is supplied in the amount necessary for BOD removal, anaerobic conditions are difficult to attain and the efficiency of denitrification is decreased, but if the MLSS concentration exceeds 15,000 mg/liter, it becomes difficult to hold the SVI below 120.

The preferred concentrator is an atmospheric or pressurized flotation thickener, roll-press type concentrator or a combination thereof, and the atomspheric flotation thickener or its combination with the roll-press type concentrator is particularly preferred. This particularly preferred concentrator is disclosed in copending U.S. Ser. No. 372,802, now U.S. Pat. No. 4,452,699 and incorporated in the present invention. A coagulant may be used in the concentrator, and a polymeric coagulant, particularly a cationic coagulant is preferred. The concentrated sludge preferably contains at least 4 wt % of solids. If the solids content is lower than 4 wt %, the desired improvement in SVI is not realized.

According to the present invention, about a third of the activated sludge in the aeration tank takes part in BOD removal, and the remainder is responsible for the removal of ammonia, nitrate, nitrite and nitrogen. Since the proportion of air supplied to a unit volume of activated sludge is smaller than that used in the conventional activated-sludge process, the amount of dissolved oxygen becomes zero in some part of the aeration tank. In other words, aerobic and anaerobic areas are formed in the aeration tank which hence permits the growth of both aerobic and facultative anaerobic bacteria at the same time. In the aerobic area, the BOD is removed by the aerobic bacteria and the ammonia is oxidized by the nitrosobacteria and nitrobacteria, whereas the nitrite or nitrate is converted to nitrogen gas in the anaerobic area by the denitrifying bacteria.

The method of the present invention has the following features.

(1) Both nitrification and denitrification are conducted in one aeration tank which is conventionally used for the sole purpose of BOD removal;

(2) To achieve the stated object, air is fed in an amount that is necessary for the conventional BOD removal but which is insufficient to produce aerobic areas in every part of the aeration tank, to thereby increase the MLSS concentration in the aeration tank to a value between 7,000 and 15,000 mg/liter (in contrast to a value between 3,000 and 4,000 mg/liter achieved by the conventional activated-sludge process) and use the excess sludge for nitrification and denitrification. Since less air is supplied to a unit amount of activated sludge in the aeration tank than in the conventional activated-sludge process, the volume of dissolved oxygen becomes zero in some part of the aeration tank to provide anaerobic conditions. As a result, both aerobic and facultative anaerobic bacteria become active in the same aeration tank to effect BOD removal, nitrification and denitrificaton simultaneously; and (3) The SVI in the aeration tank is held at not higher than about 120 for the purpose of preventing bulking and promoting the settleabiility of the solids in the sedimentation tank. This can be accomplished by concentrating part of the return sludge or mixed liquor in a separate concentrator to a solids content of 4 wt % or more and by recycling the concentrated sludge to the aeration tank. For details of the method of improving the SVI in the aeration tank by the concentrator, reference should be had to copending U.S. Ser. No. 372,802, now U.S. Pat. No. 4,452,699. It is surprising that when the excess sludge or aerated sludge is fed to the aeration tank after it has been concentrated to a solids content of 4 wt % or more by one of the concentrators mentioned above, the settleability of the sludge in the aeration tank should be significantly improved although the concentrate is immediately diluted by and dispersed in the mixed liquor. The wastewater to be treated by the method of the present invention includes every type of wastewater such as human waste, city sewage, domestic wastewater, and industrial wastewater.

The method of the present invention is illustrated in the flowsheet of FIG. 1. Raw wastewater transported or pumped to a wastewater treatment plant is subjected to a primary treatment including removal of sand and other coarse solids. The wastewater is then supplied continuously to an aeration tank in a controlled amount. The aeration tank is also fed with return sludge from the settling tank and air blown by a blower. After decomposition and removal of the BOD in the aeration tank (nitrification and denitrification also take place in the aeration tank as will be described later) and is sent to the settling tank. In the settling tank, the solids settle out and the supernatant overflows and is discharged into a watercourse after post-treatment including disinfection. Part of the concentrated sludge is returned from the settling tank to the aeration tank, and the remaining (excess) sludge is transferred to a subsequent treating apparatus such as dewatering apparatus.

So far, the scheme is entirely the same as in the BOD removal by the activated-sludge process. The method of the present invention is characterized by performing both nitrification and denitrification in the same aeration tank, and this requires the following plant design. First, a sludge concentrator is necessary for performing the method of the present invention. The preferred concentrators are already described, and whichever type is used, the sludge must be concentrated to a solids content of at least 4 wt %, and this value simply cannot be achieved by sedimentation. The aeration-tank mixed liquor or return sludge is fed to the concentrator by a pump $P_1$, and the concentrated sludge is recycled to the aeration tank. As shown in FIG. 1, the separated water is fed either to the aeration tank or the passage through which the sludge is forwarded from the aeration tank to the settling tank. By feeding the concentrated sludge to the aeration tank, the MLSS concentration in the tank can be increased and the SVI can be improved. The aeration is so designed that when the MLSS concentration is stable, the concentrated sludge is not supplied to the aeration tank and instead only the excess sludge is thickened in the concentrator. Therefore, if only the excess sludge need be concentrated valves 2 and 3 are closed and valves 1 and 4 are opened to draw the sludge from the settling tank to the concentrator by means of the pump $P_1$, and the concentrated sludge is forwarded to a subsequent sludge treatment apparatus through the valve 1. The separated water is mixed with the aeration-tank mixed liquor going to the settling tank. On the other hand, if it is also required to increase the MLSS concentration and improve the SVI in the aeration tank, the valves 1 and 3 are closed whereas the valves 2 and 4 are opened so that the sludge is concentrated and sent to the aeration tank. When the MLSS concentration in the aeration tank becomes high and the SVI is stabilized at a level below 120, the feed of the concentrated sludge to the aeration tank is stopped and normal treatment with the activated sludge is effected with the valve 2 closed and valve 1 opened. At this stage, the MLSS concentration in the aeration tank is high enough to enable the denitrification of the sludge by the method of the present invention. If the SVI becomes higher than 120 during the plant operation, the valves 1 and 4 are closed and valves 2 and 3 are opened to draw the aeration-tank mixed liquor (or return sludge) to the concentrator where it is thickened and introduced into the aeration tank for improving the SVI.

The area around air inlets in the aeration tank is held aerobic for removing the organic material, so the dissolved oxygen is rapidly consumed and the BOD is removed from the tank influent, but since the amount of activated sludge present is greater than that of the raw wastewater supplied, the aerobic reaction does not go beyond the area around the air inlets or the surface of the wastewater. On the other hand, the remaining part of the mixed liquor in the aeration tank containes less air than the activated sludge, so the amount of dissolved oxygen becomes locally zero and an anaerobic reaction, or the denitrifying reaction, proceeds.

Having the features described above, the method of the present invention accomplishes the following advantages.

(1) It enables denitrification to be effected in the conventional secondary wastewater treating step;

(2) It increases the MLSS concentration in the aeration tank and achieves a higher BOD removal efficiency;

(3) With the SVI improved, no solids will flow out of the settling tank;

(4) An existing concentrator for thickening the return sludge can be used, so no extra cost is necessary for installing denitrification apparatus;

(5) The method can be implemented with a system that requires far less floor space than the conventional activated-sludge process incorporating nitrification and denitrification; and (6) The organic matter in raw wastewater is used as an organic carbon source for denitrification, so there is no need of adding methanol to the wastewater.

The present invention is now described in greater detail by reference to the following examples.

EXAMPLE I

A series of experiments were conducted with six aeration tanks (3.4 m wide×4.8 m long×4.0 m high; air manifold = $130\phi \times 10.9 m^3/min \times 0.4$ kg/cm$^2 \times 15$ kW) at a wastewater treatment plant in Saitama Prefecture, Japan. The operating conditions were as follows: influent volume = 390 m$^3$/day, actual aeration-tank capacity = 393 m$^3$, and air supply rate = 8,000 m$^3$/day. Air was blown in a rotary flow from tube diffusers fixed to the air manifold which ran the length of each aeration tank close to the bottom along one side of the tank. To ensure that air was supplied in the minimum amount necessary for BOD removal, the DO (dissolved oxygen) level was monitored by a DO meter positioned in each of the ascending and descending parts of the rotary flow; the DO meter in the ascending flow kept registering 2 or more, and the DO meter in the descending flow kept indicating 0. An atmospheric flotation thickener was used and it had the ability to concentrate hourly 1.0 m$^3$ of sludge with a solids content of 0.8–1.0 wt % to a level of 4–7 wt %. A cationic polymeric coagulant was added in the thickener in an amount of 0.2% on the basis of the dry solids in the influent, but no other organic material (e.g. methanol) or alkali was added to the aeration tanks. Sludge was fed in an amount of 8 m$^3$ daily from the settling tank to the thickener where it was concentrated to a solids content of 5 wt % and returned to the aeration tank, to thereby increase the MLSS from the initial 3970 mg/liter to the values indicated in Table 1 below, and improve the SVI as shown in the same Table. The plant was operated for 3 days until the operation became steady, and it was operated for 7 more days, with the measurement of the nitrogen content in the raw wastewater, aeration-tank liquor and purified water being made daily. The results are shown in Table 2.

TABLE 1

| | aeration tank | | air rate | total nitrogen |
|---|---|---|---|---|
| Run No. | MLSS (mg/liter) | SVI | (m$^3$-air/ MLSS-kg · day) | removal efficiency (%) |
| control | 3970 | 152 | 5.13 | 31.8 |
| I-1 | 8120 | 107 | 2.51 | 74.6 |
| I-2 | 9970 | 88 | 2.04 | 87.6 |
| I-3 | 11900 | 90 | 1.71 | 93.0 |

TABLE 2

| | N concentration (ppm) | influent | aeration tank center | aeration tank outlet | effluent |
|---|---|---|---|---|---|
| control | NH$_4$—N | 15.70 | 11.73 | 11.18 | 10.44 |
| | NO$_2$—N | 1.41 | 1.65 | 1.06 | 0.74 |
| | NO$_3$—N | 0.63 | 1.29 | 1.87 | 1.71 |
| | organic-N | 7.74 | — | — | 4.49 |
| | total-N | 25.48 | — | — | 17.38 |
| I-1 | NH$_4$—N | 17.49 | 2.31 | 1.73 | 1.73 |
| | NO$_2$—N | 0.89 | 1.63 | 1.57 | 0.38 |
| | NO$_3$—N | 0.61 | 1.26 | 1.77 | 1.67 |
| | organic-N | 6.73 | — | — | 4.33 |
| | total-N | 25.77 | — | — | 6.07 |
| I-2 | NH$_4$—N | 18.10 | 1.23 | 1.23 | 1.06 |
| | NO$_2$—N | 1.10 | 0.41 | 0.51 | 0.22 |
| | NO$_3$—N | 0.52 | 1.32 | 2.16 | 1.17 |
| | organic-N | 10.03 | — | — | 2.63 |
| | total-N | 29.75 | — | — | 3.69 |
| I-3 | NH$_4$—N | 16.61 | 0.76 | 0.54 | 0.54 |
| | NO$_2$—N | 1.73 | 0.11 | 0.04 | 0.04 |
| | NO$_3$—N | 0.60 | 1.35 | 1.08 | 0.58 |
| | organic-N | 7.49 | — | — | 1.28 |
| | total-N | 26.43 | — | — | 1.82 |

As Table 1 shows, the percent removal of nitrogen increased with the increasing MLSS concentration in the aeration tank, or the decreasing air ratio.

Figure 2:
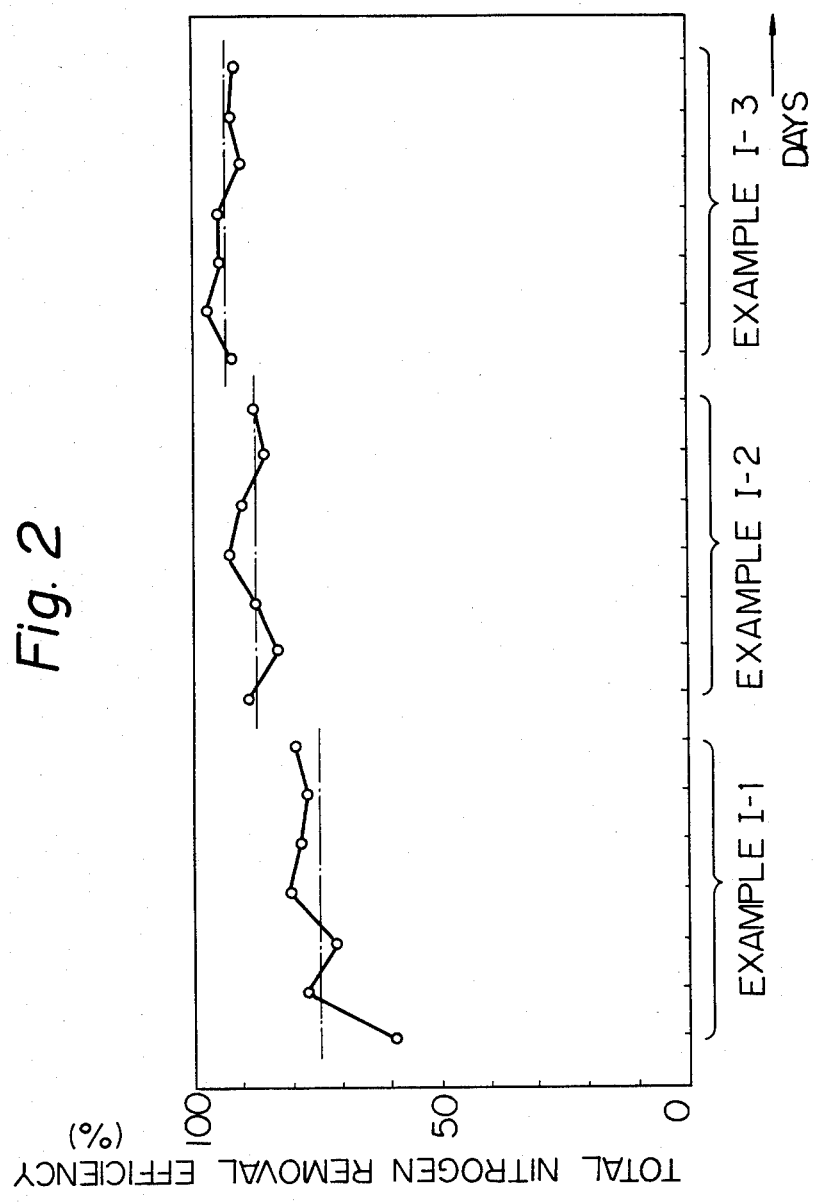
FIG. 2 is a graph depicting the result of daily measurements of percent removal of total nitrogen.
Figure 3:
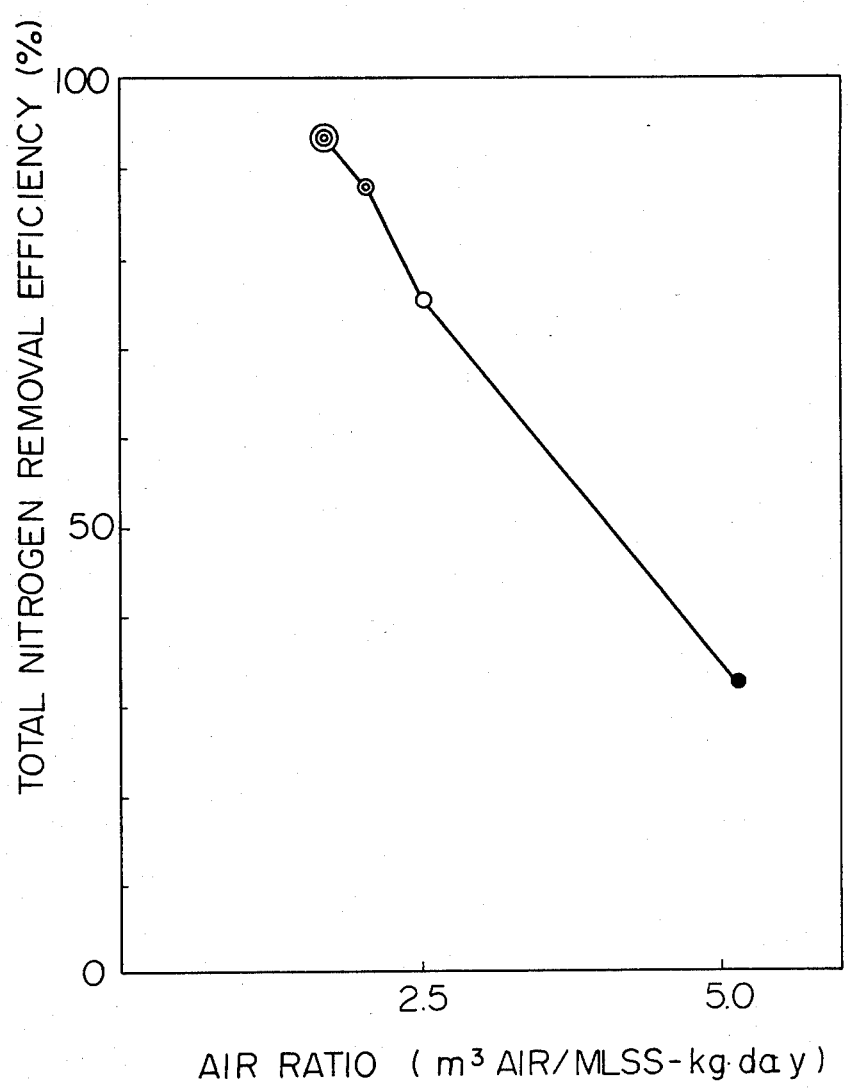
FIG. 3 is a graph showing the relation between the air ratio and percent removal of total nitrogen, wherein the solid circle, open circle, double circle and triple circle indicate a control, and three experiments according to the present invention, respectively.

In each experiment, the percent removal of total nitrogen was measured daily, and the results are graphed in FIG. 2. The relation between the air ratio and percent removal of total nitrogen was determined from the data in Table 1, and is graphed in FIG. 3.

Throughout the 7-day period of operation, the TOC in the raw wastewater and purified water was measured to see if there was any effect of reduced air ratio on the organic matter. The results are shown in FIG. 4 from which one can see that reduced air ratio had no adverse effect on the purified water. Rather, the TOC levels of the purified water obtained in the experiments according to the present invention were somewhat lower than in the control experiment.

EXAMPLE II

A series of experiments were conducted at a sewage treatment plant in Tokyo by supplying 1,200 $m^3$ of wastewater daily to aeration tanks each having a capacity of 600 $m^3$. The influent had an average BOD of 240 kg/day and the BOD volumetric loading was 0.4 kg-BOD/$m^3$.day. Air was blown into the aeration tanks in an amount of 12,000 $m^3$/day through tube diffusers installed in the same way as in Example I. The amount of dissolved oxygen was also determined in the same manner as in Example I. An atmospheric flotation thickener was used and it had the ability to concentrate 3.0 $m^3$ of sludge hourly to a solids content of 5 wt %. The nitrogen content of the raw wastewater, aeration-tank liquor and purified water was measured as in Example I. The results are listed in Tables 3 and 4 below.

TABLE 3

| Run No. | aeration tank MLSS (mg/liter) | SVI | air ratio ($m^3$-air/ MLSS-kg · day) | total nitrogen removal efficiency (%) |
|---|---|---|---|---|
| control | 2,160 | 141 | 9.26 | 29.0 |
| II-1 | 5,320 | 118 | 3.75 | 44.4 |
| II-2 | 6,660 | 105 | 3.00 | 65.0 |
| II-3 | 7,170 | 97 | 2.80 | 84.0 |
| II-4 | 8,350 | 96 | 2.40 | 84.8 |

TABLE 4

| | N concentration (mg/liter) | influent | center of aeration tank | effluent |
|---|---|---|---|---|
| Control | $NH_4$—N | 14.81 | 11.52 | 9.85 |
| | $NO_2$—N | 1.53 | 1.64 | 0.68 |
| | $NO_3$—N | 0.42 | 1.30 | 1.87 |
| | organic-N | 8.11 | — | 5.25 |
| | total-N | 24.87 | — | 17.65 |
| II-1 | $NH_4$—N | 15.38 | 10.84 | 7.08 |
| | $NO_2$—N | 0.93 | 0.95 | 0.73 |
| | $NO_3$—N | 0.21 | 1.34 | 1.52 |
| | organic-N | 9.52 | — | 5.16 |
| | total-N | 26.04 | — | 14.49 |
| II-2 | $NH_4$—N | 15.52 | 8.44 | 4.37 |
| | $NO_2$—N | 1.43 | 1.02 | 0.26 |
| | $NO_3$—N | 0.61 | 1.35 | 1.18 |
| | organic-N | 6.54 | — | 2.63 |
| | total-N | 24.10 | — | 8.44 |
| II-3 | $NH_4$—N | 17.49 | 1.52 | 1.02 |
| | $NO_2$—N | 1.83 | 0.53 | 0.21 |
| | $NO_3$—N | 0.51 | 1.49 | 1.26 |
| | organic-N | 8.35 | — | 2.03 |
| | total-N | 28.18 | — | 4.52 |
| II-4 | $NH_4$—N | 15.67 | 1.33 | 0.85 |
| | $NO_2$—N | 1.56 | 0.51 | 0.13 |
| | $NO_3$—N | 0.73 | 1.62 | 1.02 |
| | organic-N | 6.75 | — | 1.75 |
| | total-N | 24.71 | — | 3.75 |

EXAMPLE III

A series of experiments were conducted at another wastewater treatment plant in Tokyo by supplying 800 $m^3$ of wastewater daily to aeration tanks each having a capacity of 200 $m^3$. The influent had an average BOD of 160 kg/day and the BOD volumetric loading was 0.8 kg-BOD/$m^3$.day. Air was blown into the aeration tanks in an amount of 8,000 $m^3$/day through tube diffusers installed as in Example I. The amount of dissolved oxygen was also determined in the same way as in Example I. An atmospheric flotation thickener was used and it had the ability to concentrate 2.0 $m^3$ of sludge hourly to solids content of 5 wt %. The nitrogen content of the raw wastewater, aeration-tank liquor and purified water was measured as in Example I. The results are indicated in Tables 5 and 6 below.

TABLE 5

| Run No. | aeration tank MLSS (mg/liter) | SVI | air ratio ($m^3$-air/ MLSS-kg · day) | total nitrogen removal efficiency (%) |
|---|---|---|---|---|
| control | 4,150 | 155 | 9.64 | 34.5 |
| III-1 | 7,830 | 134 | 5.11 | 44.3 |
| III-2 | 14,780 | 118 | 2.71 | 82.4 |

TABLE 6

| | N concentration (mg/liter) | influent | center of aeration tank | effluent |
|---|---|---|---|---|
| control | $NH_4$—N | 18.67 | 13.51 | 10.25 |
| | $NO_2$—N | 2.08 | 2.13 | 1.19 |
| | $NO_3$—N | 0.19 | 1.42 | 1.45 |
| | organic-N | 10.11 | — | 7.33 |
| | total-N | 31.05 | — | 20.22 |
| III-1 | $NH_4$—N | 17.93 | 13.55 | 8.48 |
| | $NO_2$—N | 1.92 | 1.94 | 1.01 |
| | $NO_3$—N | 0.22 | 1.34 | 1.52 |
| | organic-N | 8.73 | — | 5.03 |
| | total-N | 28.80 | — | 16.04 |
| III-2 | $NH_4$—N | 18.22 | 3.04 | 1.02 |
| | $NO_2$—N | 1.68 | 1.18 | 0.75 |
| | $NO_3$—N | 0.10 | 1.64 | 1.36 |
| | organic-N | 9.86 | — | 2.12 |
| | total-N | 29.86 | — | 5.25 |

Table 3 shows that in the experiments in Example II where the plant was operated with a BOD volume loading of 0.4 kg-BOD/$m^3$.day and an MLSS loading of 0.2 kg-BOD/kg-MLSS.day, high efficiency removal of nitrogen could not be achieved unless the MLSS concentration was held higher than 7,000 mg/liter. When the plant was operated with a BOD volume loading of 0.8 kg-BOD/$m^3$.day and an MLSS loading of 0.2 kg-BOD/kg-MLSS.day as in Example III, an MLSS concentration at least 14,000 mg/liter was necessary for attaining high efficiency (see Table 5) of nitrogen removal. In either case, the preferred daily air supply rate is not more than 3.0 $m^3$-air/MLSS-kg.day.

What is claimed is:

1. An activated-sludge process for wastewater treatment comprising the steps of:
   (1) feeding raw wastewater to an aeration tank containing mixed liquor;
   (2) supplying air in an amount of not more than 3.0 $m^3$ air/MLSSO-kg/day into the aeration tank to produce aerobic and anaerobic areas in said tank;
   (3) concentrating at least part of the return sludge or the mixed liquor to a solids content of at least 4 wt % in a flotation concentrator or a combination of said flotation concentrator and a roll press type dehydrator to thereby produce concentrated sludge and separated water; and
   (4) feeding the concentrated sludge into the aeration tank at a SVI of not higher than 120 and maintaining the MLSS concentration in said tank at a value between 7,000 to 15,000 mg/liter, thereby removing the organic matter and nitrogen components from the wastewater within said aeration tank.

2. A process according to claim 1 wherein said concentrator is an atmospheric flotation thickener.

3. A process according to claim 2 wherein said atmospheric flotation thickener includes (i) a foaming zone for blowing air under atmospheric pressure into a liquid phase containing a coagulant and a foaming agent, (ii) a mixing zone for mixing the bubbles formed in the foaming zone with at least part of the return sludge or the mixed liquor, and (iii) a flotation tank for separating the mixture resulting in step (ii) into the concentrated sludge and the separated water.

4. A process according to claim 1 wherein a coagulant is used in the concentrator.

5. A process according to claim 4 wherein the coagulant is a cationic polymeric coagulant.

6. A process according to claim 4 wherein the MLSS concentration in the aeration tank is between 10,000 and 15,000 mg/liter.

* * * * *